United States Patent
Ingram

(10) Patent No.: US 7,418,989 B2
(45) Date of Patent: *Sep. 2, 2008

(54) ROTARY UNION ASSEMBLY FOR USE IN AIR PRESSURE INFLATION SYSTEMS FOR TRACTOR TRAILER TIRES

(75) Inventor: Anthony L. Ingram, Guthrie, OK (US)

(73) Assignee: Airgo IP, LLC, Guthrie, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/761,310

(22) Filed: Jun. 11, 2007

(65) Prior Publication Data

US 2007/0227640 A1 Oct. 4, 2007

Related U.S. Application Data

(63) Continuation of application No. 11/220,425, filed on Sep. 7, 2005, now Pat. No. 7,302,980, which is a continuation of application No. 10/851,441, filed on May 21, 2004, now Pat. No. 6,968,882, which is a continuation of application No. 09/993,019, filed on Nov. 13, 2001, now abandoned, which is a continuation of application No. 09/522,623, filed on Mar. 10, 2000, now Pat. No. 6,585,019, which is a continuation of application No. 09/079,571, filed on May 14, 1998, now Pat. No. 6,105,645.

(51) Int. Cl.
   *B60C 23/10* (2006.01)
(52) U.S. Cl. .................. 152/417; 152/415
(58) Field of Classification Search .................. 152/415, 152/416, 417

See application file for complete search history.

(56) References Cited

U.S. PATENT DOCUMENTS

| | | | | |
|---|---|---|---|---|
| 1,072,907 A * | 9/1913 | Brooks | ......... | 417/223 |
| 1,165,057 A * | 12/1915 | Bayly | ......... | 152/417 |
| 2,156,841 A * | 5/1939 | Davis | ......... | 152/417 |
| 2,657,731 A * | 11/1953 | Gozzoli | ......... | 152/417 |
| 2,849,047 A * | 8/1958 | Lamont et al. | ......... | 152/417 |
| 3,367,722 A * | 2/1968 | Miyanaga | ......... | 301/108.1 |
| 3,838,717 A * | 10/1974 | Wolf | ......... | 141/65 |
| 4,387,931 A * | 6/1983 | Bland | ......... | 303/1 |
| 4,685,501 A * | 8/1987 | Williams | ......... | 152/417 |
| 5,398,743 A * | 3/1995 | Bartos | ......... | 152/416 |
| 5,584,949 A * | 12/1996 | Ingram | ......... | 152/417 |
| 5,767,398 A * | 6/1998 | Naedler | ......... | 73/146.2 |
| 5,769,979 A * | 6/1998 | Naedler | ......... | 152/417 |
| 6,105,645 A * | 8/2000 | Ingram | ......... | 152/415 |
| 6,585,019 B1 * | 7/2003 | Ingram | ......... | 152/417 |
| 6,968,882 B2 * | 11/2005 | Ingram | ......... | 152/417 |
| 7,302,980 B2 * | 12/2007 | Ingram | ......... | 152/415 |

* cited by examiner

*Primary Examiner*—Russell D Stormer
(74) *Attorney, Agent, or Firm*—Holland & Knight LLP; Richard E. Lyon, Jr.

(57) ABSTRACT

Preferably, a tire inflation system includes a hub cap secured to a wheel attached to an axle of a vehicle, the axle providing a source of pressurized air. The tire inflation system preferably includes a rotary union assembly with a rotating portion and a non-rotating portion, the rotating portion attachable to the exterior of the hub cap for rotation with the hub cap. The non-rotating portion preferably includes a non-rotating shaft defining an air passage therethrough in fluid communication with the source of pressurized air for transferring pressurized air from the source to the tire. An end of the non-rotating shaft preferably provides a first bearing surface and a housing is rotatably mounted thereon for rotation with the hub cap. The rotating portion preferably includes a rotary member rotating with the housing, the rotary member defining a second bearing surface disposed in abutment with the first bearing surface.

23 Claims, 4 Drawing Sheets

ROTARY UNION ASSEMBLY FOR USE IN AIR PRESSURE INFLATION SYSTEMS FOR TRACTOR TRAILER TIRES

CROSS-REFERENCE TO RELATED APPLICATIONS

This application is a continuation of U.S. application Ser. No. 11/220,425 filed Sep. 7, 2005, now U.S. Pat. No. 7,302,980 which is a continuation of U.S. application Ser. No. 10/851,441 filed May 21, 2004, now U.S. Pat. No. 6,968,882, issued Nov. 29, 2005, which is a continuation of U.S. application Ser. No. 09/993,019 filed Nov. 13, 2001 (abandoned), which is a continuation of U.S. application Ser. No. 09/522,623 filed Mar. 10, 2000, now U.S. Pat. No. 6,585,019, issued Jul. 1, 2003, which is a continuation of U.S. application Ser. No. 09/079,571 filed May 14, 1998, now U.S. Pat. No. 6,105,645, issued Aug. 22, 2000.

BACKGROUND OF THE INVENTION

The present invention relates to an improved rotary assembly for use in a central tire inflation system for automatically maintaining the inflation pressure of the pneumatic tires on moving vehicles such as tractor trailers. Automatic central tire inflation systems for vehicle tires are well known and the subject of several U.S. patents, including Nos. 3,276,503; 4,387,931; 4,883,106; 5,287,906 and 5,584,949, the disclosures of which are incorporated herein by reference.

The central tire inflation systems employed on typical tractor trailers utilize the air compressor on the tractor as a source of pressurized air to fill a leaking tire while the trailer is in motion. The compressor directs air to the reserve air brake tank on the trailer, which generally corresponds to the range of typical inflation pressures in the tires used on trailers. Air from the reserve air brake tank is first directed to the braking system to maintain the air pressure in the braking system. Excess air is directed from the tank through a pressure protection valve to a control box for the tire inflation system. The pressure protection valve only opens to direct the air to the control box when excess air pressure is present, thereby preventing air from being directed to the air inflation system which is needed for the trailer braking system. The control box contains a pressure regulator which is set to the cold tire pressure of the particular tires on the trailer so as to supply air to the tires at the desired pressure level in the event of a leak. Air is directed from the control box to the leaking tire through one of the trailer axles, which either carries an air line from the control box, or is sealed and functions as an air conduit. The pressurized air carried by the axles communicates with each pair of trailer tires mounted thereon through a rotary union assembly by which air flow is directed from a stationary air line to the valve stems on the rotating tires. Pressure responsive valves are employed between each rotary union assembly and its associated tires so that upon the occurrence of a leak in one of the tires, the resulting pressure loss will cause one of the valves to open and allow air flow from the rotary union assembly to pass therethrough to the leaking tire.

While these central tire inflation systems are well known and in widespread use, they suffer from several shortcomings. The rotary union assemblies employed in these systems have a relatively limited useful life span before the rotary seals begin to leak. The rotary seals, or rotary unions as they are frequently called, which are employed in these assemblies are generally located within the wheel lubrication compartments adjacent the ends of the axles. Accordingly, any air leakage in the rotary union seals causes an air pressure build up within the lubrication compartment which can damage the oil seals therein, and create an oil leak. If the wheel bearings lose their lubrication, they will seize up and can cause a fire. In addition to creating the potential for a dangerous fire, the positioning of the rotary union within the lubrication compartment of the wheel makes accessibility to the elements comprising the rotary union both difficult and awkward. As a result, the costs of repair and replacement are significantly increased.

In a preferred embodiment, the present invention provides a rotary union assembly for automatic central tire inflation systems which exhibits a substantially longer life than the rotary union assemblies heretofore in use. In addition, the assembly is preferably configured so as to position the rotary union outside of the lubrication compartment for the vehicle wheels and thus avoids pressure build-ups within the compartment in the unlikely event of a leak in the rotary union seal. The preferred assembly also provides ready access to the rotary union components thereof without having to enter the lubrication compartment to facilitate part replacement. As a result, the present invention provides a substantial improvement in air pressure maintenance systems for tractor trailer tires.

Other problems facing central tire inflation systems include a lack of uniformity in tractor trailer wheel hub cap configurations and off-center mountings. The former situation results in variations in the axial distance between the ends of the axle spindles and end walls of the hub caps. This distance generally determines the spacing between the air inlet of the assembly and the rotary seal therein. It would be highly desirable to provide a rotary union assembly which could readily accommodate such dimensional variations and thereby obviate the need to provide differently sized assemblies or replacement components for different hub cap configurations. Preferably, the rotary union assembly should also accommodate off-center alignments of the axle spindle and hub caps without incurring additional wear on the air seals in the assembly which further shortens the life of the assembly. The preferred embodiment of the rotary union assembly of the present invention achieves these objectives as well.

SUMMARY OF THE INVENTION

In accordance with preferred embodiments, a tire inflation system is provided with a hub cap secured to a wheel attached to an axle of a vehicle, the axle provides a source of pressurized air. The tire inflation system further includes at least a rotary union assembly attachable to the exterior of the hub cap. The rotary union assembly preferably includes at least a rotating portion and a non-rotating portion, the rotating portion rotates with hub cap. The non-rotating portion including at least a stationary shaft defining an air passageway therethrough in fluid communication with the source of pressurized air and configured for conducting pressurized air from said source of pressurized air to a tire mounted to the wheel of the vehicle.

In an alternate preferred embodiment, a tire inflation system incorporates at least an axle of a vehicle, which provides a source of pressurized air, a wheel secured to the axle for rotation about the axle, a hub cap attached to the wheel for rotation with the wheel, and a tire mounted to the wheel for rotation with the wheel about the axle. Preferably, the tire inflation system further includes a rotary union assembly attachable to the exterior of the hub cap for rotation with the hub cap, the rotary union assembly including at least a non-rotating shaft defining an air passage therethrough in fluid communication with the source of pressurized air, for transferring pressurized air from the source of pressurized air to the tire of the vehicle.

These and various other features and advantages that characterize the claimed invention will be apparent upon reading the following detailed description and upon review of the associated drawings.

DESCRIPTION OF THE PREFERRED EMBODIMENT IN THE DRAWINGS

Referring now in detail to the drawings, the rotary union assembly 10 of the present invention, while useable on a wide variety of movable vehicles employing stationary axles for automatically maintaining the inflation pressure of the pneumatic tires thereon, is particularly adapted for use on tractor trailers. Accordingly, the assembly 10 will be described in conjunction with a pair of adjacent vehicle tires 12 and 14 mounted on a stationary tractor trailer axle 16. While identical rotary union assemblies 10 are provided at the end of each axle on the trailer to maintain the inflation pressure of the tires carried thereby, reference will be made to only one such assembly and the pair of tires it services.

Figure 1:
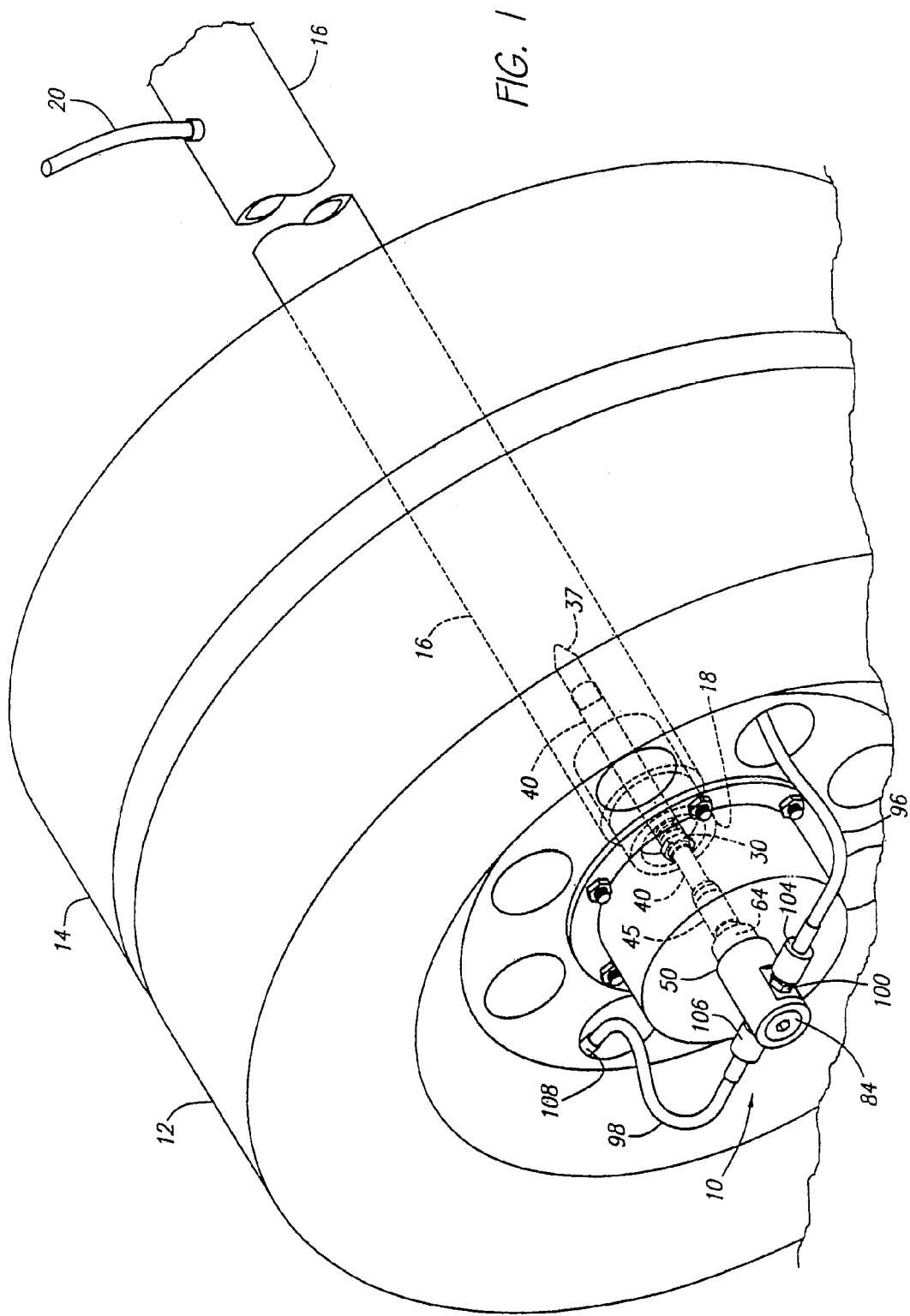
FIG. 1 is a partial perspective view of the rotary union assembly of the present invention shown secured to a hub cap on the outer wheel of a pair of tractor trailer tires mounted on a stationary axle.
Figure 2:
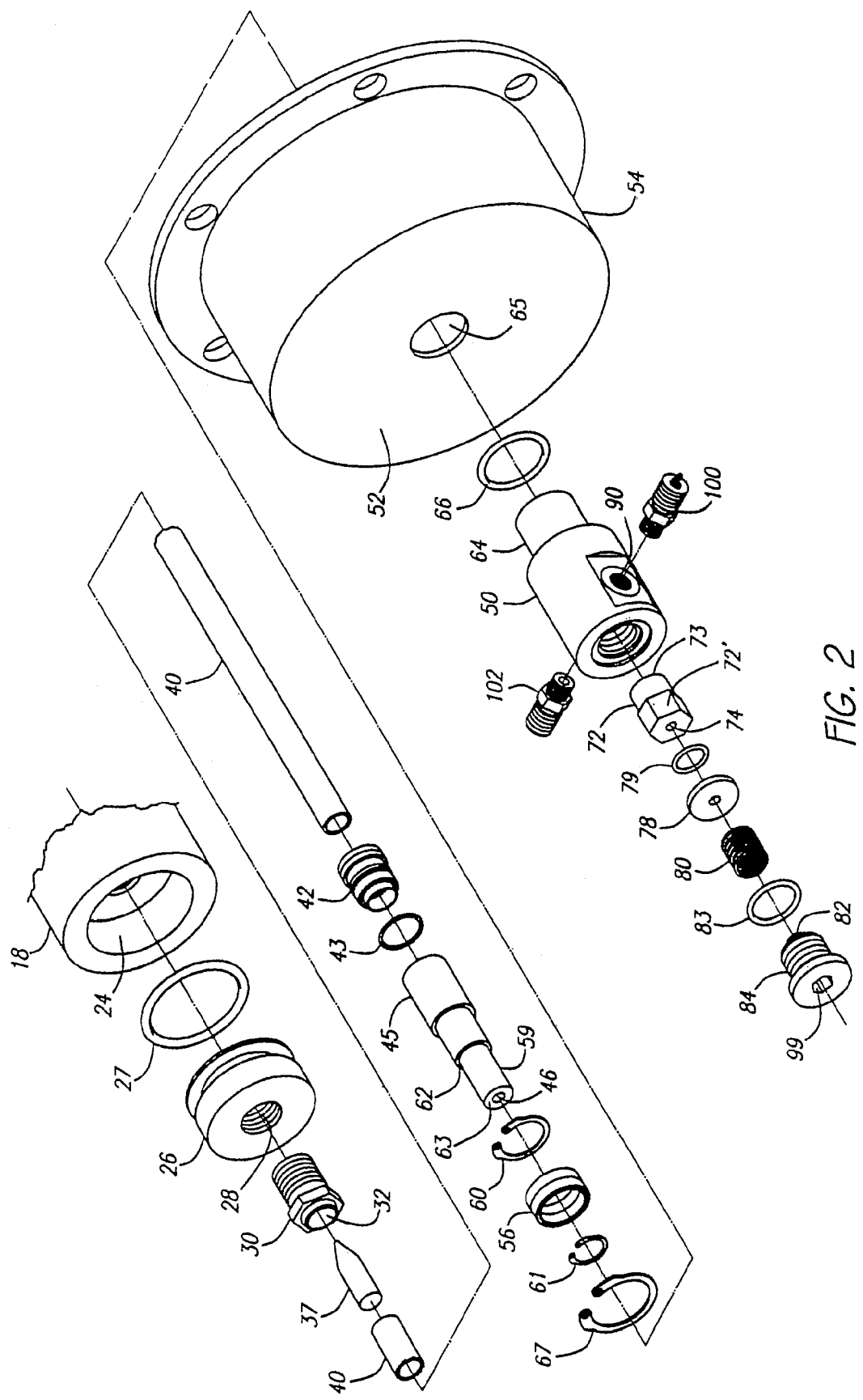
FIG. 2 is an exploded perspective, view of the components of the rotary union assembly of the present invention.
Figure 3:
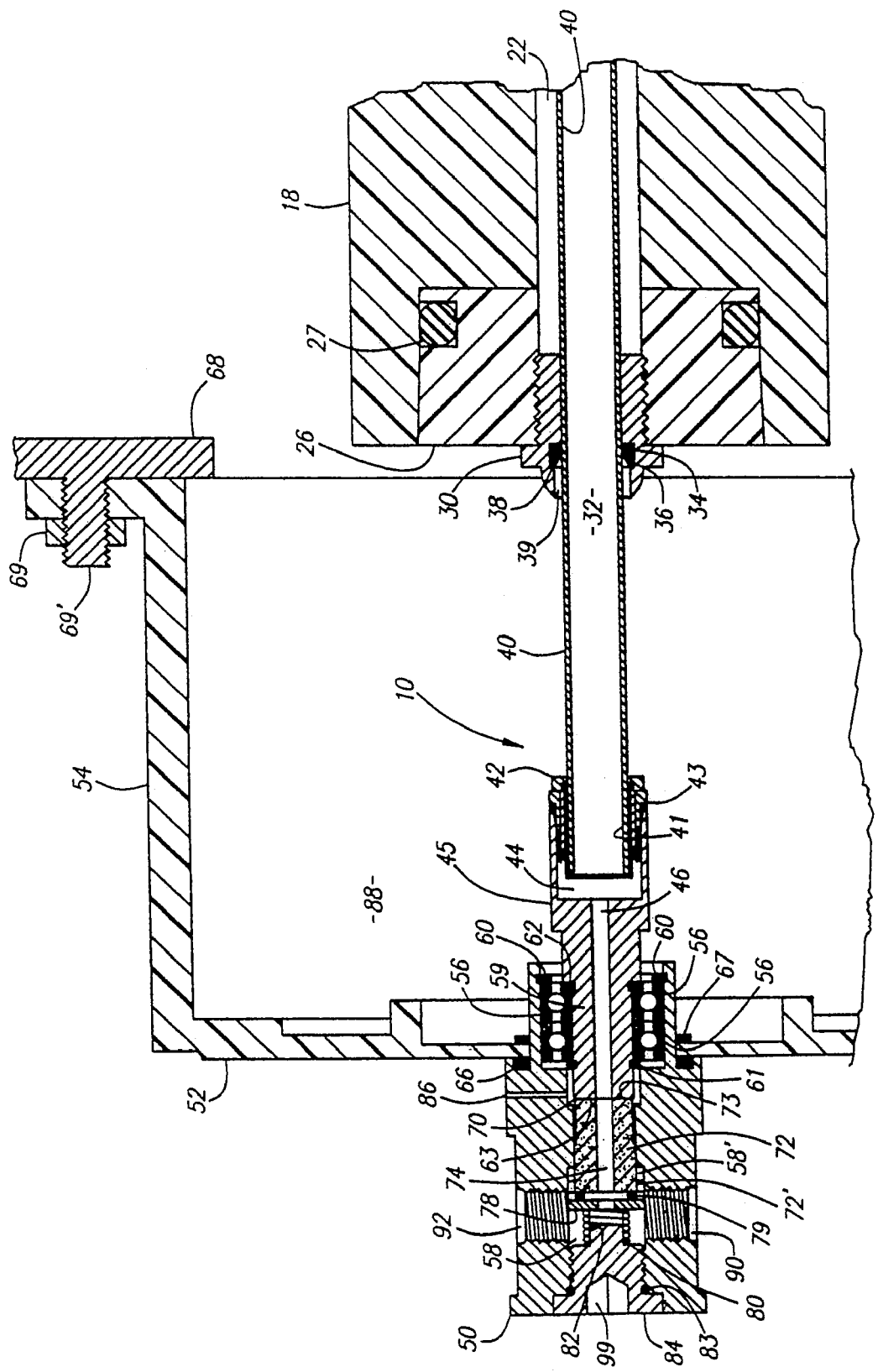
FIG. 3 is a sectional side view of the rotary union assembly of the present invention and associated axle spindle.

The trailer axle 16 which carries tires 12 and 14 is sealed and functions as an air conduit to communicate the spindles 18 welded to the extended ends of a trailer axle 16 with an air supply line 20. Air supply line 20 provides air under pressure to the interior of axle 16 from the conventional air compressor on the tractor via a standard pressure protection valve and control box (not shown) to pressurize the axle at the cold tire pressure of the trailer tires. As seen in FIGS. 2 and 3, axle spindle 18 has a centrally disposed conduit 22 extending axially therethrough which terminates at its downstream end in an enlarged cylindrical bore 24. A cylindrical plug 26 provided with an o-ring 27 mounted in a groove in its outer surface is sealably secured in bore 24. Plug 26 defines a centrally disposed axial threaded opening 28 therein. Plug 26 can be secured in bore 24 in a press fit or by means of self-tapping threads. A through flow fitting 30 is threadably engaged in opening 28 with the treads thereon being of the NPT type and preferably coated with a suitable sealant so as to form an airtight fitment with plug 26. In an alternate embodiment of trailer axles which define solid ends, the extended ends are drilled and tapped to provide the threaded opening 28 for fitting 30.

Fitting 30 defines an open axial channel 32 extending therethrough and carries an o-ring 34 therein extending about channel 32 adjacent a seal retaining ring 36. O-ring 34 and retaining ring 36 are disposed in an offset portion 38 of channel 32 which terminates in a downstream, slightly enlarged channel portion 39 as seen in FIG. 3. A flexible air hose 40 is disposed in channel 32 and projects therethrough into conduit 22 in spindle 18 so as to communicate with the interior of pressurized axle 16. A suitable air filter 37 is provided in an upstream end portion of hose 40 within axle 16 to remove any debris from the air flow through hose 40 which might exist within the axle interior. The o-ring 34 carried in fitting 30 forms an airtight seal about air hose 40 while allowing for the hose to be axially adjusted with respect to fitting 30. The downstream end portion 41 of air hose 40 is secured within a second fitting 42 which security grips air hose 40. A fitting marketed by Parker Hannifin Corporation under the name Presto Encapsulated Cartridge Model PPMCEN-4, tube size ¼, is ideally suited for fitting 42 for use with hose 40 having a 0.250-in. outside diameter. Flexible hose 40 is preferably constructed of a nylon or plastic material and defines a wall thickness of about 0.050 in.

Fitting 42 carries an external o-ring 43 and is sealably secured in a press fitment within a chamber 44 formed in the upstream end of an elongated steel shaft 45 axially aligned with air hose 40. Shaft 45 has an axially disposed air channel 46 extending therethrough communicating with chamber 44. Shaft 45 projects into a rotary housing 50 which is mounted exteriorly adjacent the end wall 52 of hub cap 54. Rotary housing 50 defines a channel 58 extending axially therethrough for receiving shaft 45 and the other components of the rotary union 70. A pair of high quality self-lubricating bearings 56 are mounted within housing 50 about a portion of channel 58 which receive in a press fitment a downstream portion 59 of the shaft 45 so as to provide a freely rotational mounting of the rotary housing 50 on shaft 45. Bearings marketed by NTN Bearing Corporation of America of Mt. Prospect, Ill. under the model designation W688AZZ/1K have been found to be well suited for this application. The bearings 56 are secured in place within housing 50 by retaining rings 60 and 61. The downstream portion 59 of shaft 45 which projects through bearings 56 is of a reduced diameter to define a bearings abutment shoulder 62 and a flat end face 63.

A reduced diameter portion 64 of rotary housing 50 projects through a centrally disposed aperture 65 in the end wall of hub cap 54 such that the rotary housing can be sealably secured against the exterior end wall 52 of the hub cap 54 in axial alignment with the hub cap and shaft 45, flexible air hose 40 and fitting 30 by means of an exterior o-ring 66 and interior locking ring 67. The hub cap 54 is secured to the outer tire wheel 68 by means of the threaded engagement of the wheel lug nuts 69 with lug bolts 69'. Accordingly, rotation of tires 12 and 14 will effect rotation of the wheel hub cap 54 and rotary housing 50 with respect to the axially aligned and stationary shaft 46, air hose 40 and fitting 30.

The rotary union or seal 70 in rotary housing 50 is defined by the stationary elongated shaft 45, an axially aligned graphite element 72 having an open ended channel 74 extending axially therethrough, a steel washer 78, an o-ring 79 disposed between washer 78 and the downstream end of the graphite element 72, and a coil spring 80 carried by a cylindrical protection 82 on a plug 84. Plug 84 is provided with an o-ring 83 thereon and is threadably secured in a sealing engagement in the extended end of the rotary housing 50. The graphite element defines a hexagonal portion 72' which fits within a correspondingly configured portion 58' of the flow through channel 58 in rotary housing 50 such that rotational movement of housing 50 with hub cap 54 is imparted to graphite element 72. The spring member 80 when compressed to 0.25 inches produces spring force of about 5.5 to 6.0 pounds and bears against plug member 84 and washer 78 so as to urge the upstream planar end face 73 of graphite element 72 against the flush downstream adjacent planar end face 63 of the stationary shaft 45. A weep hole 86 is provided in the rotary housing 50 which communicates with channel 58 therein proximate the abutment of the rotating end face 73 on the graphite element 72 with the end face 63 of stationary shaft 45. Thus, in the event any air leakage were to occur at the rotary union 70, the air would pass to the atmosphere and not pressurize the bearings or leak past the bearings to the lubrication compartment 88 within the hub cap. In addition, a plurality of conventional duck bill type relief valves (not shown) would preferably be provided in the hub cap end wall 52, radially spaced from rotary housing 50, so that in the unlikely event an air leak within the hub cap were to occur, a pressure build up in the lubrication compartment would be avoided.

Figure 4:
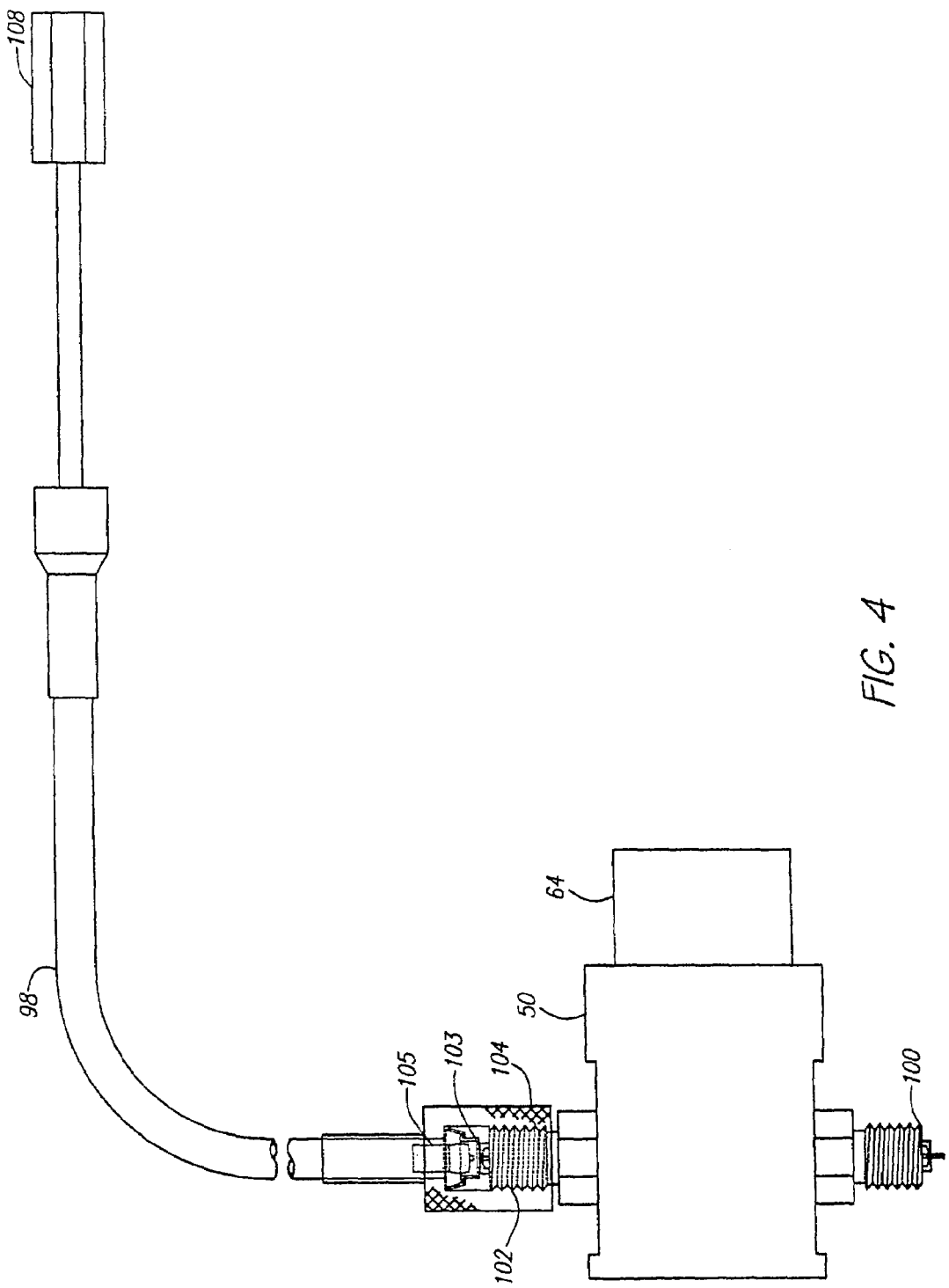
FIG. 4 is a partial side view of the rotary housing, air lines and associated valves employed in the rotary union assembly of the present invention.

A pair of oppositely aligned radial channels 90 and 92 are provided in the rotary housing 50 which communicate with the axial channel 58 therein proximate spring member 80 as seen in FIG. 3. Through the aforesaid configuration, air under pressure in axle 16 passes into and through stationary flexible hose 40, fittings 30 and 42 and the stationary shaft 45 into the rotating graphite element 72 being urged against the shaft by spring member 80. The air then passes through element 72 and into housing channels 90 and 92 for direction to the trailer tires 12 and 14 via air lines 96 and 98 (see FIG. 4). The resulting rotary seal has been found to exhibit an extremely long life without leakage. By means of the threadably engaged plug 84, which defines an Allen wrench opening 99 in the head portion thereof, ready access is provided to the interior of the rotary housing 50 and the elements comprising the rotary seal 70 disposed therein.

The opposed channels 90 and 92 in rotary housing 50 are provided with internal threads for the threaded engagement therein of Schraeder valves 100 and 102 respectively. (See FIG. 4.) Valves 100 and 102 each have an opening pressure of about 90 psi and are held open by a conventional check valve depressor 103 (only one being shown) mounted in the air hoses 96 and 98 within knurled nut ends 104 and 106 carried thereby. Mounted downstream and substantially adjacent depressors 103 are a second pair of Schraeder valves 105 (only one being shown) which are normally closed and have an opening pressure of about 3 psi. Air hoses 96 and 98 project in opposed directions from rotary housing 50 to the conventional valve stems (not shown) carried on tires 12 and 14. The threaded hose fittings 108 carried by downstream ends of air hoses 96 and 98 for threaded engagement with the tire valve stems are each provided with a check valve depressor (not shown) such that upon threadably securing the air hoses to the valve stems, the check valves in the tire valve stems are maintained in an open disposition, thereby communicating the interior of tires 12 and 14 with air hoses 96 and 98.

Through the aforesaid configuration, air under a pressure corresponding to that of the cold pressure of the vehicle tires 12 and 14 is provided from axle 16 through the rotary union assembly 10 and the open Schraeder valves 100 and 102 carried by the rotary housing 50. Because the air passing through valves 100 and 102 to valves 105 is at the same pressure as the air within tires 12 and 14, valves 105 are balanced and remain closed, preventing air flow through the rotary union assembly 10. In the event of a leak in one of the tires, the resulting pressure drop downstream in air hose 96 or 98 will create a pressure imbalance across the valve 105 mounted therein. As soon as this imbalance reaches 3 psi, the valve 105 will open, allowing air to pass therethrough to the leaking tire to maintain the desired inflation pressure within the tire. When the automatic air inflation system is shut down, the pressure within the axle remains at the tire inflation pressure. Accordingly, valves 105 remain balanced and closed so that the tires will not deflate. If the axle were to leak so that the pressure were to drop on the upstream side of valves 105, they would remain closed so that the tires would not release air to the depressurized chamber within the axle. If one were to remove one of hoses 96 or 98 from housing 50, as would occur if the hoses were damaged, valve 100 or 102 would close so that the system would not continually blow air to the atmosphere.

Finally, a warning light (not shown) is provided so as to alert the driver in the event of the activation of the automatic tire inflation system, which would be indicative of a tire leak. In addition, if one were to disconnect one of air hoses 96 or 98 from its respective tire stem, the warning light would also illuminate so that the automatic tire inflation system would not continuously pump air through the system without the knowledge of the driver. Such a warning system could comprise a microswitch in electrical communication with the wiring harness on the trailer which closes upon the activation of the control box in the automatic tire inflation system and triggers a transmitter which would send a signal to a receiving unit mounted on the front left corner of the trailer. The receiving unit would activate a plurality of LED's which would be clearly visible to the driver through the side mirror of the attached tractor.

Various changes and modifications may be made in carrying out the present invention without departing from the spirit and scope thereof. Insofar as these changes and modifications are within the purview of the appended claims, they are to be considered as part of the present invention.

I claim:

1. A tire inflation system comprising:
a hub cap secured to a wheel attached to an axle of a vehicle, the axle providing a source of pressurized air; and
a rotary union assembly attachable to the exterior of said hub cap and comprising a rotating portion and a non-rotating portion, said rotating portion for rotation with said hub cap, said non-rotating portion including at least a stationary shaft in fluid communication with said source of pressurized air, said shaft defining an air passage therethrough for conducting pressurized air from said source of pressurized air to a tire mounted to the wheel of the vehicle.

2. The tire inflation system of claim 1, further comprising a stationary fitting carried by an end of the axle and defining an open channel extending axially therethrough.

3. The tire inflation system of claim 2, further comprising an annular sealing member disposed in said fitting about said open channel.

4. The tire inflation system of claim 3, in which said rotating portion comprises a housing rotatably mounted on said stationary shaft and providing an attachment feature for securement of said housing to the exterior of said hub cap for rotation with said hub cap, said housing further defining at least one air passageway extending therethrough such that said stationary shaft communicates with said air passageway in said housing.

5. The tire inflation system of claim 4, further comprising an air conduit assembly communicating said air passageway in said housing with the tire of the vehicle.

6. The tire inflation system of claim 5, in which said stationary shaft defines a first bearing surface at one end thereof, said rotating portion further comprising a rotary member mounted within said air passageway in said housing for rotation with said housing, said rotary member having an air passage extending therethrough and communicating with said air passage of said stationary shaft and defining a second bearing surface disposed in abutment with said first bearing surface.

7. The tire inflation system of claim 6, in which said annular seal is an o-ring, said o-ring inhibiting rotation of said stationary shaft.

8. The tire inflation system of claim 7, further comprising a second air conduit assembly, the vehicle comprising a second tire, said housing defines an axial chamber therein, and said air passageway comprising a pair of opposed radial channels communicating with said chamber, said stationary shaft and said rotary member being disposed in said axial chamber and wherein said each air conduit assembly communicates one of said opposed radial channels with one of the vehicle tires for directing said pressurized air from said housing to the tires.

9. The tire inflation system of claim 8, further comprising a tube communicating with and disposed between the axle and said stationary shaft, said tube defining an upstream end portion and a down stream end portion, said upstream end portion extending axially through said open channel in said fitting and communicating with the interior of the axle, said o-ring engaging said tube and forming an airtight seal within said fitting about said tube, whereby air flow is directed from the axle through said tube member and stationary shaft to said rotating portion of said rotary union assembly.

10. The tire inflation system of claim 9, in which at least a portion of said tube is flexible such that a sealed air flow conduit can be provided between said fitting and said housing attached to said hub cap when said hub cap is out of axial alignment with said fitting.

11. The tire inflation system of claim 10, in which said tube is axially translatable with respect to said o-ring in said fitting whereby the axial spacing between said housing and the axle can be varied.

12. The tire inflation system of claim 11, further comprising a spring member for urging said second bearing surface against said first bearing surface.

13. The tire inflation system of claim 4, in which said air conduit assembly is an air hose assembly.

14. A tire inflation system comprising:
an axle of a vehicle providing a source of pressurized air;
a wheel secured to said axle for rotation about said axle;
a hub cap attached to said wheel for rotation with said wheel;
a tire mounted to said wheel for rotation with said wheel about said axle; and
a rotary union assembly attachable to the exterior of said hub cap for rotation with said hub cap, the rotary union assembly comprising a non-rotating shaft, said shaft defining an air passage therethrough in fluid communication with said source of pressurized air for transferring pressurized air from said source of pressurized air to said tire.

15. The tire inflation system of claim 14, further comprising a stationary fitting carried by an end of said axle and defining an open channel extending axially therethrough, said stationary fitting facilitating transfer of said pressurized air from said source of pressurized air to said tire.

16. The tire inflation system of claim 14, further comprising an air conduit assembly communicating with and disposed between said rotary union assembly and said tire, said air conduit assembly for conducting said pressurized air from said source of pressurized air to said tire.

17. The tire inflation system of claim 15, further comprising an annular sealing member disposed in said fitting about said open channel, said annular sealing member for maintaining said source of pressurized air in a pressurized state.

18. The tire inflation system of claim 14, in which said rotary union assembly further comprises a rotating portion comprising a housing rotatably mounted on said non-rotating shaft and providing an attachment feature for securement of said housing to the exterior of said hub cap for rotation with said hub cap, said housing further defining at least one air passageway extending therethrough such that said non-rotating shaft is in fluid communication with said air passageway in said housing.

19. The tire inflation system of claim 18, in which said non-rotating shaft defines a first bearing surface at one end thereof, and said rotating portion further comprising a rotary member mounted within said air passageway in said housing for rotation with said housing, said rotary member having an air passage extending therethrough and communicating with said air passage of said non-rotating shaft and defining a second bearing surface disposed in abutment with said first bearing surface.

20. The tire inflation system of claim 19, in which said annular seal is an o-ring, said o-ring inhibiting rotation of said non-rotating shaft.

21. The tire inflation system of claim 20, further comprising a stationary fitting carried by an end of said axle and defining an open channel extending axially therethrough, a tube communicating with and disposed between said stationary fitting and said non-rotating shaft, said tube defining an upstream end portion and a down stream end portion, said upstream end portion extending axially through said open channel in said fitting and communicating with the interior of said axle, said o-ring engaging said tube and forming an airtight seal within said fitting about said tube, whereby air flow is directed from said stationary fitting through said tube and said non-rotating shaft to said rotating portion of said rotary union assembly.

22. The tire inflation system of claim 21, in which said tube is axially translatable with respect to said o-ring in said fitting such that the axial spacing between said housing and said axle can be varied, and in which at least a portion of said tube is flexible such that a sealed air flow conduit can be provided between said fitting and said housing attached to said hub cap when said hub cap is out of axial alignment with said fitting.

23. The tire inflation system of claim 16, in which said air conduit assembly is an air hose assembly.

* * * * *